United States Patent
Meirosu et al.

(10) Patent No.: US 9,509,565 B2
(45) Date of Patent: Nov. 29, 2016

(54) ENERGY EFFICIENCY IN SOFTWARE DEFINED NETWORKS

(71) Applicant: Telefonaktiebolaget L M Ericsson (publ), Stockholm (SE)

(72) Inventors: Catalin Meirosu, Stockholm (SE); Wolfgang John, Johanneshov (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 686 days.

(21) Appl. No.: 13/853,196

(22) Filed: Mar. 29, 2013

(65) Prior Publication Data
US 2014/0298052 A1  Oct. 2, 2014

(51) Int. Cl.
*H04L 12/24* (2006.01)
*G06F 1/32* (2006.01)
*H04L 12/12* (2006.01)

(52) U.S. Cl.
CPC .......... *H04L 41/0833* (2013.01); *G06F 1/324* (2013.01); *H04L 12/12* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 2003/0126232 A1* | 7/2003 | Mogul | G06F 17/30902 709/219 |
| 2008/0133767 A1* | 6/2008 | Birrer et al. | 709/231 |
| 2008/0211230 A1* | 9/2008 | Gurin | B60L 11/1861 290/2 |
| 2009/0097442 A1* | 4/2009 | Diab | H04L 12/40136 370/329 |
| 2009/0154473 A1* | 6/2009 | Diab | H04L 12/4013 370/400 |
| 2009/0154491 A1* | 6/2009 | Diab | H04L 5/1446 370/465 |
| 2009/0195349 A1* | 8/2009 | Frader-Thompson | G01D 4/002 340/3.1 |
| 2010/0115295 A1* | 5/2010 | Diab | 713/300 |
| 2010/0162023 A1* | 6/2010 | Rotem | G06F 1/3203 713/340 |
| 2010/0332869 A1* | 12/2010 | Hsin et al. | 713/320 |
| 2011/0252257 A1* | 10/2011 | Diab | H04L 12/12 713/323 |
| 2012/0188885 A1* | 7/2012 | Tazebay | H04L 41/0816 370/252 |
| 2012/0287829 A1* | 11/2012 | Chang | H04L 5/16 370/296 |
| 2012/0317900 A1* | 12/2012 | Den Boer | C03B 18/14 52/173.3 |
| 2012/0324102 A1* | 12/2012 | Lee et al. | 709/224 |
| 2012/0331315 A1* | 12/2012 | Diab | G06F 1/266 713/310 |
| 2013/0195120 A1* | 8/2013 | Diab et al. | 370/474 |
| 2013/0238158 A1* | 9/2013 | Gan | G06Q 10/04 700/295 |
| 2014/0006534 A1* | 1/2014 | Jain | G06F 9/5094 709/208 |

OTHER PUBLICATIONS

Author Unknown, "IEEE Standard 802.3az—2010—Amendment 5: Media Access Control Parameters, Physical Layers and Manangement Parameters for Energy-Efficient Ethernet," IEEE Standard for Information Technology, Copyright: 2010, 264 pages, The Institute of Electrical and Electronics Engineers, Inc., New York, NY.

(Continued)

*Primary Examiner* — Ninos Donabed
(74) *Attorney, Agent, or Firm* — Withrow & Terranova, PLLC (57) ABSTRACT

Mechanism for implementing energy efficiency (EE) policies on flows in a software defined network are disclosed. A controller node receives from each of a plurality of datapath nodes, a corresponding set of EE actions that the respective datapath node is capable of implementing. A flow is identified, and a group of datapath nodes through which the flow is routed is identified. Based on an attribute of the flow, an EE policy is determined. Based on the EE policy, a datapath node in the group of datapath nodes is directed to perform an EE action on packets associated with the flow.

16 Claims, 8 Drawing Sheets

(56) References Cited

OTHER PUBLICATIONS

Gupta, Maruti et al., "Dynamic Ethernet Lunk Shutdown for Energy Cconservation on Ethernet Links," IEEE International Conference on Communications, Jun. 2007, 6 pages.

Heller, Brandon et al., "ElasticTree: Saving Energy in Data Center Networks," NSDI '10 Proceedings of the 7th USENIX Conference on Networked Systems Design and Implementation, Copyright: 2010, 16 pages.

Heller, Brandon et al., "Ripcord: A Modular Platform for Data Center Networking," SIGCOMM '10, Aug. 30-Sep. 3, 2010, pp. 457-458, New Delhi, India.

Jarschel, Michael et al., "An OpenFlow-Based Energy-Efficient Data Center Approach," SIGCOMM '12, Aug. 13-17, 2012, pp. 87-88, Helsinki, Finland.

Raja, Ahmad Nazir et al., "Energy Efficient Client-Centric Shaping of Multi-Flow TCP Traffic," 2010 IEEE/ACM International Conference on Cyber, Physical and Social Computing (CPSCom), Dec. 2010, 8 pages.

Staessens, Dimitri et al., "Software Defined Networking: Meeting Carrier Grade Requirements," 2011 18th IEEE Workshop on Local & Metropolitan Area Networks (LANMAN), Oct. 13-14, 2011, 6 pages.

Wang, Xiadong et al., "CARPO: Correlation-Aware Power Optimization in Data Center Networks," 2012 Proceedings IEEE INFOCOM, Mar. 2012, 9 pages.

\* cited by examiner

ENERGY EFFICIENCY IN SOFTWARE DEFINED NETWORKS

TECHNICAL FIELD

The embodiments relate generally to energy efficiency in a network, and in particular to implementing energy efficient policies on flows in a software defined network.

BACKGROUND

Energy efficiency is increasingly important to operators of communications equipment. Network nodes, such as switches, bridges, routers, and the like consume substantial amounts of power even when such nodes are not actively processing data. This results in unnecessary energy consumption and costs. Communications standards, such as Institute of Electrical and Electronics Engineers (IEEE) 802.3az Energy-Efficient Ethernet, for example, are being developed to help address these issues.

Also of interest to operators is the current work on moving control and intelligence from individual switching, routing, and bridging nodes to a single controller node, as exemplified, for example, by a software-defined network (SDN). SDN is a network architecture wherein the forwarding plane (sometimes referred to as the data plane) and the control plane, which are conventionally implemented in a single network node, are separated and implemented in two distinct network nodes. Such distinct network nodes may be referred to as a datapath node and a controller node, respectively. An example of an SDN architecture, or specification, is the Open Flow Switch Specification, version 1.3.

Theoretically, by separating the forwarding function and the control function into different network nodes, multiple relatively inexpensive datapath nodes may be coupled together and controlled by a single controller node, resulting in an overall lower network cost. Another potential advantage of an SDN is that a single controller node can be more easily programmed to implement new network functionality than would be possible by programming multiple conventional network nodes that combine the control plane and the forwarding plane, thereby simplifying the implementation of additional networking functions in the network.

Although datapath nodes in an SDN may implement IEEE 802.3az energy-efficient algorithms, currently such algorithms are relatively simplistic, and are not based on the type of flow that the datapath node is processing. Centralized power-management functions for SDNs wherein the controller node directly controls when the datapath node enters or exits an energy-efficient mode have been proposed. Unfortunately, a centralized power-management function requires substantial signaling between the controller node and the datapath nodes, and is thus better suited for energy efficiency of relatively long-term periods of time, such as the period of time outside of normal business hours. A centralized power-management function that directly controls the datapath nodes may result in substantial network usage, and may also not be scalable to large networks with hundreds or thousands of datapath nodes. Moreover, different types of flows may be suitable for different types of energy efficiency policies. Accordingly, there is a need for more robust and flexible energy-efficient mechanisms, particularly in the context of an SDN network.

SUMMARY

The embodiments relate to the implementation of energy efficient policies on flows in a software-defined network (SDN). In one embodiment, an energy efficiency (EE) policy is implemented on a flow. A controller node receives from each of a plurality of datapath nodes, a corresponding set of EE actions that the respective datapath node is capable of implementing. The controller node identifies a flow, and identifies a group of datapath nodes through which the flow is routed. Based on an attribute of the flow, the controller node determines an EE policy, and based on the EE policy, directs at least one datapath node in the group of datapath nodes to perform an EE action from the corresponding set of EE actions on packets associated with the flow.

Among other advantages, the present embodiments facilitate centralized management of intelligent EE policies on flows in a network, with a relatively minimal amount of message traffic between the controller node and those datapath nodes that process the flow.

In one embodiment, the controller node determines the EE policy based on an attribute of the flow, such as a type of flow, a source node of the flow, a destination node of the flow, or the like. Thus, a first EE policy may be implemented on a video streaming flow type, and a second EE policy may be implemented on a file download flow type.

In some embodiments, the EE actions performed on the flow by different datapath nodes in the flow may differ. For example, a first datapath node in a group of datapath nodes may implement a first EE action wherein the first datapath node buffers a packet in the flow for a maximum period of time T1 when a port on the first datapath node associated with the flow is in an EE mode. A second datapath node in the group of datapath nodes may implement a second EE action wherein the second datapath node drops a maximum of X packets of a total of Y received packets when a port on the second datapath node associated with the flow is in an EE mode.

In another embodiment, a datapath node communicates a set of EE actions that the datapath node is capable of implementing to a controller node. The datapath node receives, from the controller node, a direction to perform at least one first EE action of the set of EE actions on a flow routed through the datapath node. The datapath node performs, on the flow, the at least one first EE action. Among other advantages, the present embodiment facilitates a datapath node intelligently implementing one or more EE actions on flows in response to a direction from a controller node, but without the need to repeatedly exchange messages with the controller node during the duration of the flow.

In one embodiment, the datapath node modifies a flow table that identifies the flow to indicate that the at least one first EE action is to be performed on the flow. As the datapath node receives a packet associated with a flow, the datapath node accesses the flow table and determines that the at least one first EE action is to be performed on the packet, and performs the at least one first EE action on the packet.

In one embodiment, the datapath node receives, for each respective flow of a plurality of flows, directions from the controller node to perform a different EE action on each respective flow. The datapath node modifies the flow table that identifies each respective flow to indicate that the different EE action is to be performed on the respective flow. As the datapath node receives packets associated with different flows, the datapath node performs the respective different EE actions on the packets, based on the flow with which each respective packet is associated. Thus, among other features, the embodiments facilitate flow-based EE policies.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
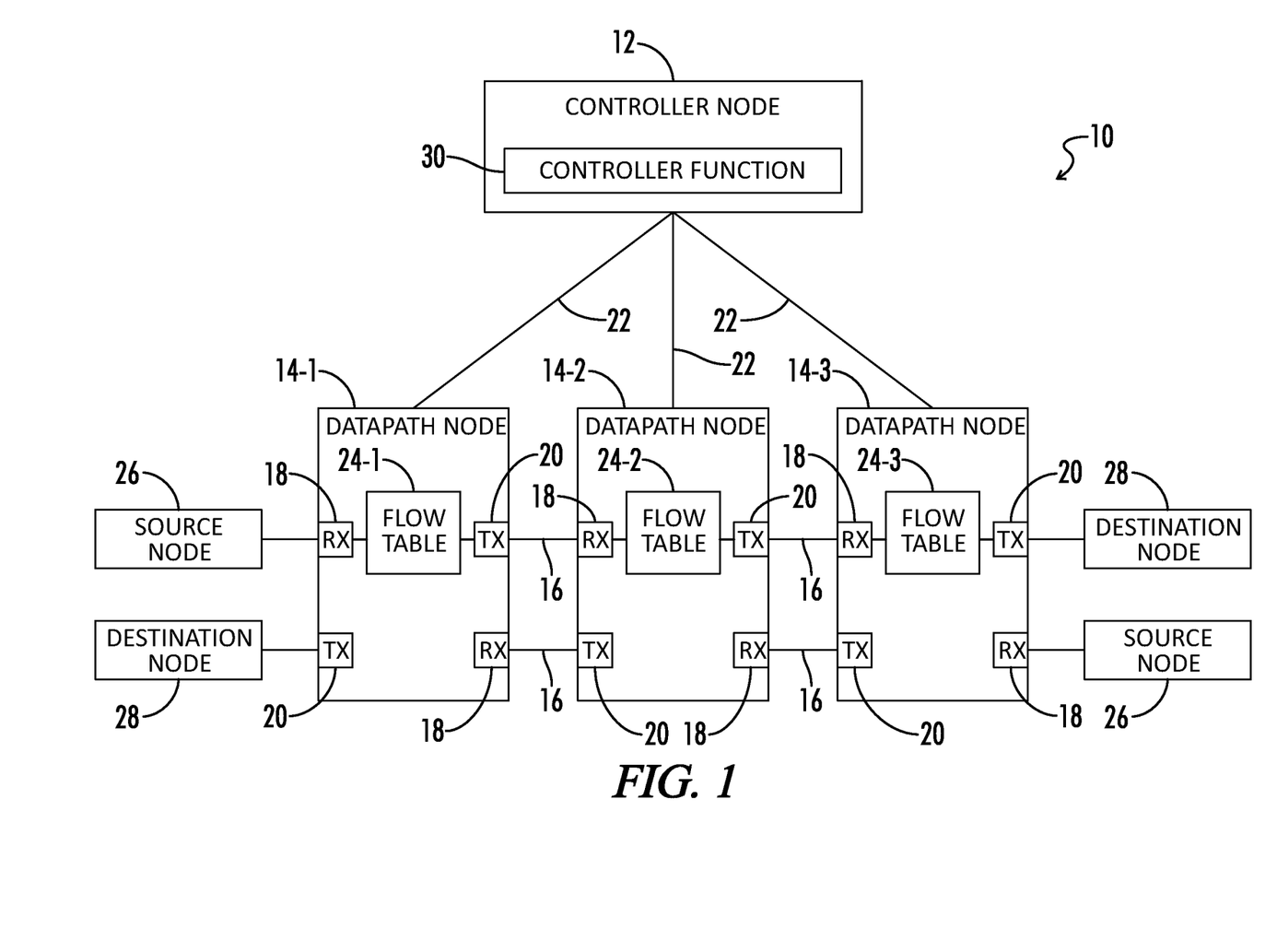
FIG. 1 is a block diagram of a system illustrating a software-defined network (SDN) according to one embodiment.

The present embodiments relate to the implementation of energy efficiency (EE) policies on a flow in a software-defined network (SDN). Before delving into the details of the embodiments, aspects of an example SDN will be discussed. FIG. 1 is a block diagram of a system 10 illustrating an SDN according to one embodiment. The term SDN, as used herein, refers to any network where forwarding plane functionality, sometimes referred to as data plane functionality, is implemented in a plurality of network nodes, referred to herein as datapath nodes, under the control of control plane functionality that is implemented in a separate network node, referred to herein as a controller node. An example of an SDN architecture, or specification, is the Open Flow Switch Specification, version 1.3 (hereinafter "OpenFlow Switch Specification"), available from the Open Networking Foundation, and the contents of which are hereby incorporated herein by reference. However, the OpenFlow Switch Specification is but one example of an SDN architecture, and the embodiments described herein are not limited to any particular type of SDN architecture, and indeed are applicable in any network architecture wherein forwarding plane functionality is separated from control plane functionality in different devices.

The use herein of ordinals, such as "first," "second," and "third" in conjunction with an element name, such as "datapath node," is solely for distinguishing what might otherwise be similar or identical element names, such as "first datapath node" and "second datapath node," and does not imply a priority, a hierarchy, or an importance, nor does it contain any temporal or sequential meaning, unless otherwise stated herein.

The system 10 includes a controller node 12 and a plurality of datapath nodes 14-1-14-3 (generally, datapath nodes 14). While in practice the system 10 may comprise multiple controller nodes 12 and any number of datapath nodes 14, for purposes of illustration only one controller node 12 and three datapath nodes 14 are depicted. Each of the datapath nodes 14 may be communicatively coupled to other devices, including to the other datapath nodes 14, via communication links 16. The communication links 16 are coupled to receive ports 18 and transmit ports 20 of respective datapath nodes 14. Each datapath node 14 is also communicatively coupled to the controller node 12 via a communication link 22.

The datapath nodes 14 may include respective flow tables 24-1-24-3 (generally, flow tables 24). A flow table 24 may maintain information about each flow handled by the respective datapath node 14. As used herein, the term "flow" refers to a continuous or discontinuous stream of data packets through the system 10 communicated between a source node 26 and a destination node 28. Each datapath node 14 may be associated with many flows, and typically processes such flows under the control of the controller node 12.

In operation, the controller node 12, in some embodiments via a controller function 30, upon learning of a new flow in the system 10, determines a group of datapath nodes 14 that will collectively transport the flow from a source node 26 to a destination node 28. The controller node 12 may then instruct each datapath node 14 that it will participate in carrying the flow, and direct each datapath node 14 to direct packets in the flow to a particular downstream datapath node 14, or to the respective destination node 28. The datapath nodes 14, in turn, store such information in the respective flow tables 24, and upon receipt of a packet at a receive port 18, match the packet to a particular flow based on the respective flow table 24, and send the packet to the designated downstream datapath node 14.

Figure 2:
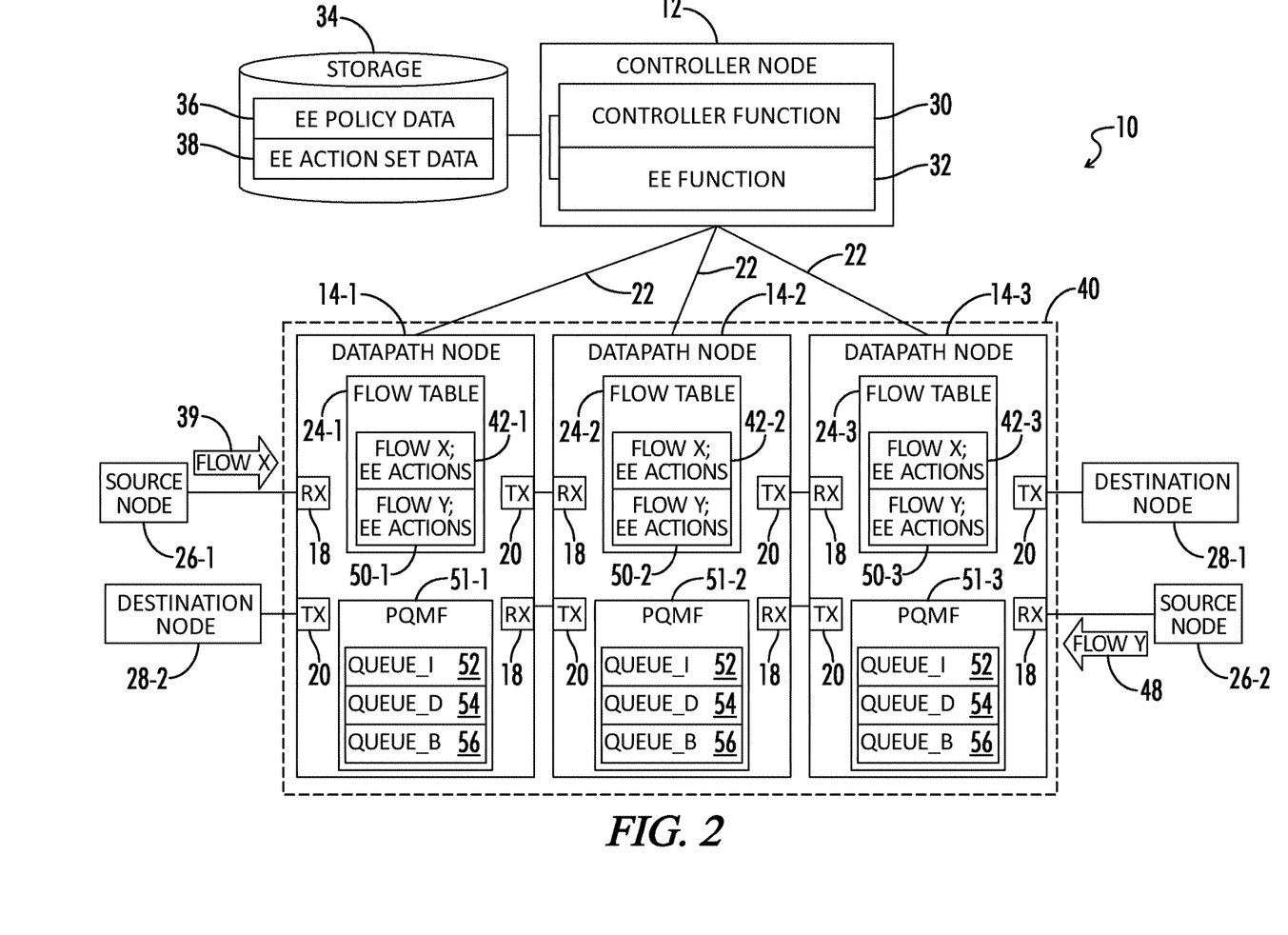
FIG. 2 is a block diagram of the system illustrated in FIG. 1 in which embodiments may be practiced.

FIG. 2 is a block diagram of the system 10 in which embodiments may be practiced. In these embodiments, the controller node 12 includes an energy efficiency (EE) function 32, which, as will be discussed in greater detail herein, determines EE policies to apply to one or more flows that are implemented in the system 10. The controller node 12 is coupled to or integral with a storage 34 in which EE policy data 36 and EE action set data 38 may be stored. The EE policy data 36 defines or otherwise identifies EE policies that are to be applied to a flow in the system 10. Each EE policy is implemented via one or more EE actions that are performed by at least one datapath node 14 in the group of datapath nodes 14 that implement the flow. EE actions that may be performed by the datapath nodes 14 are identified in the EE action set data 38.

Figure 3:
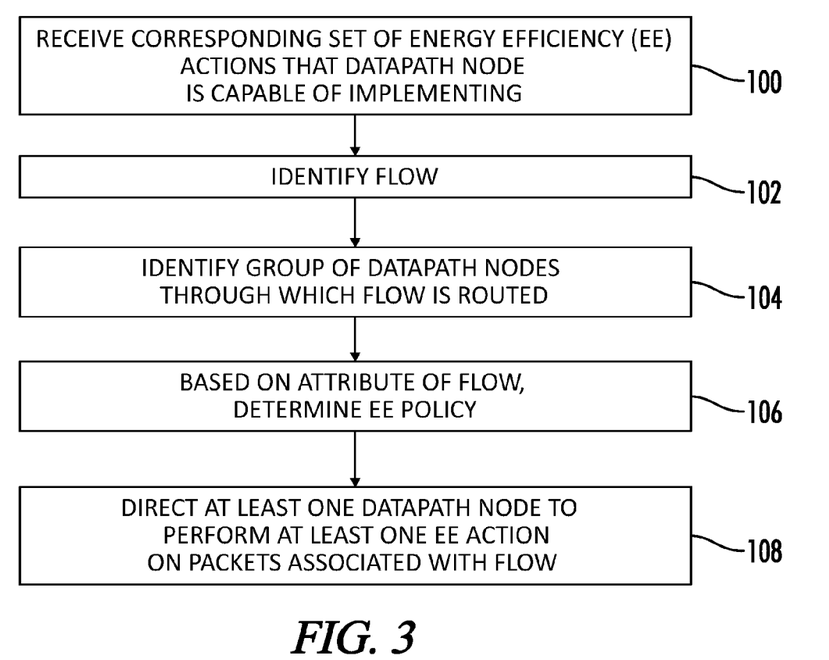
FIG. 3 is a flowchart of a method for implementing an energy efficiency (EE) policy on a flow according to one embodiment.

FIG. 3 is a flowchart of a method for implementing an EE policy on a flow according to one embodiment. FIG. 3 will be discussed in conjunction with FIG. 2. Initially, the controller node 12 receives, from each of the datapath nodes 14-1-14-3 (generally, datapath nodes 14), a corresponding set of EE actions that the respective datapath node 14 is capable of implementing on a flow (FIG. 3, block 100). In one embodiment, the datapath nodes 14 may communicate the corresponding set of EE actions to the controller node 12 during an initialization phase of a datapath node 14. EE actions may comprise any suitable action that a datapath node 14 is capable of implementing in response to the receipt of a packet and that serves to reduce energy consumption associated with the datapath node 14. By way of non-limiting example, EE actions, in some embodiments, relate to the ability to delay the sending of a packet, ability to drop a packet, such that a transmit port 20 that is in an EE mode is not immediately awakened to transmit a packet received by the datapath node 14, or the ability to put a component of the datapath node 14 into a lower power state. For example, the datapath node 14 may indicate that it is capable of buffering a packet in the flow for a maximum period of time T1 when a port on the datapath node 14 associated with the flow is in an EE mode. As another example, a datapath node 14 may indicate that it is capable of dropping a maximum of X packets out of a total of Y received packets when a port on the datapath node 14 associated with the flow is in an EE mode. As another example, a datapath node 14 may indicate that it is capable of randomly dropping packets, and/or randomly dropping a maximum of X packets out of a total of Y received packets. As another example, a datapath node 14 may indicate that it is capable of immediately transmitting any packet. Additional examples of EE actions are provided below.

The controller node 12 identifies a flow in the system 10 (FIG. 3, block 102). The flow may be identified at any point in the duration of the flow, including, for example, as the flow is set up by the controller node 12 in the system 10, or subsequent to the flow being set up by the controller node 12. For example, the flow may be identified in response to operator input, such as input directing the controller node 12 to implement a particular EE policy on every existing flow in the system 10 that has a particular characteristic or attribute.

Assume for purposes of illustration that a source node 26-1 initiates a new flow 39 by directing a packet to the destination node 28-1. The packet is initially transmitted by the source node 26-1 to the datapath node 14-1. The datapath node 14-1 receives the packet, and accesses the flow table 24-1. The datapath node 14-1 may determine that the flow 39 has not yet been set up by the controller node 12. The datapath node 14-1 may then send a message to the controller node 12 identifying the flow 39. In this example, therefore, the controller node 12 identifies the flow 39 in response to notification of the flow 39 by the datapath node 14-1.

The controller node 12 identifies a group 40 of the datapath nodes 14 through which the flow 39 will be routed from the source node 26-1 to the destination node 28-1 (FIG. 3, block 104). The controller node 12 accesses the EE policy data 36 and based on an attribute of the flow 39, determines an EE policy to apply to the flow 39 (FIG. 3, block 106). Any attribute or characteristic of the flow 39 may be used to determine the EE policy. Example attributes include the particular source node 26 that originates the flow 39, the particular destination node 28 that receives the flow 39, the particular customer associated with the flow 39, or a data type of the flow 39. For example, one EE policy may apply to a realtime data flow such as a video or audio data stream, and another EE policy may apply to a non-realtime data flow such as a file download.

Additional examples of EE policies may include the following:
- Voice over Internet Protocol (VoIP) flows should be buffered at most 10 ms, and no packets should be dropped;
- FTP flows should be buffered at most 200 ms, and the packet drop rate should be less than one packet dropped for each 100,000 packets in the flow;
- all Open Shortest Path First (OSPF) HELLO packets should be buffered at most 10 ms, and the packet drop rate should be no greater than one packet for each three packets in the flow; and
- flows that originate from IP virtual private network (VPN) Gold-level customers should not be buffered nor dropped nor should the port transmission speed be reduced.

The controller node 12 then directs at least one datapath node 14 to perform at least one EE action on the packets associated with the flow 39 (FIG. 3, block 108). This direction may come in conjunction with or separate from any control messages to the datapath node 14 to set up the flow 39. For example, assume that the flow 39 is a VoIP flow, and the EE policy indicates that a VoIP flow should be buffered by each of the datapath nodes 14 in the group 40 for no more than a maximum of 10 ms, and that no packets associated with a VoIP flow should be dropped. In conjunction with a control message to the datapath node 14-1 to set up the new flow 39, the controller node 12 may also send a direction to the datapath node 14-1 to implement an EE action on the flow 39 such that any packet in the flow 39 should be buffered no more than 5 ms and no packets should be dropped. The datapath node 14-1 receives the control message to set up the flow 39 and the direction to implement the EE action, and stores the EE action and the identification of the flow 39 as an entry 42-1 in the flow table 24-1.

The controller node 12 may send to the datapath node 14-2 a control message to set up the new flow 39, and a direction to implement an EE action on the flow 39 such that any packet in the flow 39 should be buffered no more than 5 ms and no packets should be dropped. The datapath node 14-2 receives the control message to set up the new flow 39 and the direction to implement the EE action, and stores the EE action and the identification of the flow 39 as an entry 42-2 in the flow table 24-2.

The controller node 12 may send to the datapath node 14-3 a control message to set up the new flow 39, and a direction to implement an EE action on the flow 39 such that no packet in the flow 39 should be buffered and no packets should be dropped. The datapath node 14-3 receives the control message to set up the new flow 39 and the direction to implement the EE action, and stores the EE action and the identification of the flow 39 as an entry 42-3 in the flow table 24-3.

EE actions associated with an EE policy may, in one embodiment, be communicated from the controller node 12 to the datapath nodes 14 by extending the OpenFlow 1.3 flow_mod message, which programs the flow table for each individual flow. In one embodiment, the EE actions may be stored in an extra field of the existing OF flow tables 24. The EE actions may be invoked by the instruction types OFPIT_WRITE_ACTIONS or OFPIT_APPLY_ACTIONS.

In some embodiments, EE actions associated with flows may be stored in a separate table maintained by the datapath node 14. In such embodiments, the OpenFlow 1.3 flow_mod message may be expanded in the following manner:

```
/* Flow setup and teardown (controller -> datapath). */
struct ofp_flow_mod {
struct ofp_header header;
uint64_t cookie;                /* Opaque controller-issued identifier. */
uint64_t cookie_mask;           /* Mask used to restrict the cookie bits that
must match when the command isOFPFC_MODIFY* or OFPFC_DELETE*. A
value of 0 indicates no restriction. */
/* Flow actions. */
uint8_t table_id;               /* ID of the table to put the flow in.
For OFPFC_DELETE_* commands, OFPTT_ALLcan also be used to delete
matching flows from all tables. */
uint8_t command;                /* One of OFPFC_*. */
uint16_t idle_timeout;          /* Idle time before discarding (seconds). */
uint16_t hard_timeout;          /* Max time before discarding (seconds). */
uint16_t priority;              /* Priority level of flow entry. */
uint32_t buffer_id;             /* Buffered packet to apply to, or
OFP_NO_BUFFER. Not meaningful for OFPFC_DELETE*. */ uint32_t
out_port; /* For OFPFC_DELETE* commands, require matching entries to
include this as an output port. A value of OFPP_ANY indicates no restriction.
*/
uint32_t out_group;             /* For OFPFC_DELETE* commands, require
matching entries to include this as anoutput group. A value of OFPG_ANY
indicates no restriction. */
uint16_t flags;                 /* One of OFPFF_*. */
uint8_t pad[2];
struct ofp_match match;         /* Fields to match. Variable size. */
struct ofp_instruction instructions[0];    /* Instruction set */
stuct_ofp_ee_instructions ee_instructions[0];   /* EE instruction set, used
to populate the EE table (together with the of_match structure*/
};
enum ofp_ee_instruction_type {
OFPIT_WRITE_EE_ACTIONS = 3,     /* Write the EE action(s) onto the
datapath action set */
OFPIT_APPLY_EE_ACTIONS = 4,     /* Applies the EE action(s)
immediately */
};
/* Instruction structure for OFPIT_WRITE/APPLY_EE_ACTIONS */
struct ofp_instruction_actions {
uint16_t type;                  /* One of OFPIT_*_EE_ACTIONS */
uint16_t len;                   /* Length of this struct in bytes. */
struct ofp_action_header actions[0];   /* Actions associated with
OFPIT_WRITE_EE_ACTIONS and OFPIT_APPLY_EE_ACTIONS */
};
```

According to one embodiment, the controller node 12 directs datapath nodes 14 to take particular EE actions based at least in part on the set of EE actions associated with the respective datapath nodes 14 that are identified in the EE action set data 38.

Thus, capabilities of the datapath nodes 14 may be matched against the EE policy that is to be implemented on the respective flow. For example, as illustrated in the example flow 39 discussed above, the total time that a packet may be buffered by the group 40 of datapath nodes 14 may be distributed throughout the datapath nodes 14 along the path of the flow 39. The particular amount of time that any datapath node 14 may buffer a packet may depend in part on the amount of time the datapath node 14 is capable of buffering a packet, as identified in the EE action set data 38. For example, if the datapath node 14-1 has sufficient memory only to buffer a packet for 3 ms, then the controller node 12 may direct the datapath node 14-1 to buffer any packet no more than 3 ms.

Datapath nodes 14 closer to the ingress of the flow, such as closer to the source node 26-1, may be directed to drop a packet, based on the capability of the datapath nodes 14 closest to the source node 26-1. A cost for implementing each EE action may also be considered. For example, the controller node 12 may determine it is too costly (or slow, from a packet processing performance point of view) to implement both "drop" and "buffer" for a flow in a particular datapath node 14, even though the datapath node 14 has indicated that the datapath node 14 is capable of implementing either "drop" or "buffer" actions individually.

Additional examples of EE actions that the datapath nodes 14 may be directed to implement on a flow are now provided. Assume that the flow 39 is a VoIP flow. The flow 39 may be identified as a VoIP flow, for example, through a Real-time Transport Protocol (RTP) header in the initial packet transmitted by the source node 26-1. Assume further that an EE policy exists that indicates that VoIP flows should be buffered at most 10 ms and no packets should be dropped. The controller node 12 may direct the group 40 of datapath nodes 14 to implement the following EE actions:

Datapath node 14-1: {buffer<10 ms, drop=0}
Datapath node 14-2: {buffer=0, drop=0}
Datapath node 14-3: {buffer=0, drop=0}.

Alternatively, the controller node 12 may direct the group 40 of datapath nodes 14 to implement the following EE actions:

Datapath node 14-1: {buffer=0, drop=0}
Datapath node 14-2: {buffer<5 ms, drop=0}
Datapath node 14-3: {buffer<5 ms, drop=0}.

In another example, assume that the flow 39 is a File Transport Protocol (FTP) flow. Assume further that an EE policy exists that FTP flows should be buffered at most 200 ms and the packet drop rate should be less than one packet dropped for each 100,000 packets in the FTP flow. The controller node 12 may direct the group 40 of datapath nodes 14 to implement the following EE actions:

Datapath node 14-1: {buffer<100 ms, drop<1 in 100000}
Datapath node 14-2: {buffer<50 ms, drop=0}
Datapath node 14-3: {buffer<50 ms, drop=0}.

Alternatively, the controller node 12 may direct the group 40 of datapath nodes 14 to implement the following EE actions:

Datapath node 14-1: {buffer<150 ms, drop=0}
Datapath node 14-2: {buffer<50 ms, drop<1 in 100000}
Datapath node 14-3: {buffer=0, drop=0}.

Thus, in some situations, each datapath node 14 that participates in carrying the flow may be directed to perform a different EE action on the flow.

In another example, assume that the flow 39 is an OSPF flow. An OSPF flow may be identified, for example, by a protocol code having a value of 89 in the Internet Protocol (IP) header of the initial packet transmitted by the source node 26-1. Assume further that an EE policy exists that all OSPF HELLO packets should be buffered at most 10 ms and the packet drop rate should be no greater than one packet for each three packets in the flow. The controller node 12 may direct the group 40 of datapath nodes 14 to implement the following EE actions:

Datapath node 14-1: {buffer<10 ms, drop<1 in 3}
Datapath node 14-2: {buffer=0, drop=0}
Datapath node 14-3: {buffer=0, drop=0}.

Alternatively, the controller node 12 may direct the group 40 of datapath nodes 14 to implement the following EE actions:

Datapath node 14-1: {buffer=0, drop<1 in 10}
Datapath node 14-2: {buffer<10 ms, drop<1 in 3}
Datapath node 14-3: {buffer=0, drop=0}.

In another example, assume that the source node 26-1 is an IP VPN Gold customer. This may be identified, for example, by a protocol code having a value of 50 in the IP header of the initial packet transmitted by the source node 26-1, and by matching the IP address of the source node 26-1 against a list of Gold VPN customers, or a list of Gold VPN services active in the system 10. Assume further that an EE policy exists that indicates that flows that originate from IP VPN Gold-level customers should not be buffered nor dropped nor should the port transmission speed be reduced. The controller node 12 may direct the group 40 of datapath nodes 14 to implement the following EE actions:

Datapath node 14-1: {buffer=0, drop=0, port speed=max}
Datapath node 14-2: {buffer=0, drop=0, port speed=max}
Datapath node 14-3: {buffer=0, drop=0, port speed=max}.

Alternatively, the controller node 12 may direct the group 40 of datapath nodes 14 to implement the following EE actions:

Datapath node 14-1: {buffer=0, drop=0, port speed=max}
Datapath node 14-2: {buffer=0, drop=0}
Datapath node 14-3: {buffer=0, drop=0}.

As another example of implementing an EE policy on a flow, assume that the group 40 of datapath nodes 14-1-14-3 is carrying a flow 48, and the flow 48 is a video data stream. Assume further that an operator initiates a new EE policy that packets associated with video data stream flows are to be buffered a maximum of 15 ms and that no packets are to be dropped. In response, the controller node 12 may direct each of the datapath nodes 14-1-14-3 to implement EE actions on the flow 48, which may be stored as entries 50-1-50-3 in tables 24-1-24-3, respectively. Thus, the datapath nodes 14 may receive directions for each respective flow of a plurality of flows in the system 10, and the directions may differ for each respective flow. The datapath nodes 14 modify the respective flow table 24, to indicate that the different EE action is to be performed on each respective flow, and perform, on each respective flow, the particular EE action based on the flow table 24.

An EE action may also comprise putting a component of the datapath node 14 into a lower power state, or a sleep state. For example, in some embodiments a datapath node 14 may include a packet processing engine (PPE) (not illustrated) that supports the Advanced Configuration and Power Interface (ACPI) specification, or a subset thereof, and has the capability to transition between several power states or performance states (sometimes referred to as C or P states). In particular, in ACPI, a power state refers to the processor power consumption within a global working state, and a performance state refers to power consumption and capabilities within the $C_0$ power state. A $C_0$ power state is full power when all processing capabilities of a datapath node 14 are operational. A $C_1$ power state is the first sleep state, saving, for example, 70% of the energy consumed by the datapath node 14 in $C_0$ power state. The transition time between $C_1$ and $C_0$ power states may be relatively fast (e.g., about 100 ns). The $C_2$ power state is the second sleep state, saving additional energy compared to the $C_0$ power state. The transition time between $C_2$ and $C_0$ power states may be relatively slower, (e.g., about 1 millisecond).

In general, a PPE may transition directly from a $C_x$ power state to the $C_0$ power state such that any intermediate states, such as a $C_{x-1}$ power state, are not entered during the transition. A $C_3$ power state is a deeper sleep state that may require re-initialization of certain registers or associated cache memory in the datapath node 14 before packet processing may be resumed. Transition time from the $C_3$ power state may be undefined, and may, for example, take microseconds or take tens of milliseconds, depending on the context and what in the datapath node 14 is to be re-initialized.

In such embodiments, the datapath node 14 may be configured to ignore some of the ACPI C states, or ACPI P states. In one embodiment, the capability to implement such EE actions may be communicated from a datapath node 14 to the controller node 12 by adding the following to the enum ofp_ee_capabilities structure:

```
{
OFPC_EE_ALLOW_ACPI_C1 = 1<<3, /* allow transition to ACPI C1 state*/
OFPC_EE_ALLOW_ACPI_C2 = 1<<4, /* allow transition to ACPI C2 state*/
OFPC_EE_ALLOW_ACPI_C3 = 1<<5, /* allow transition to ACPI C3 state*/
OFPC_EE_ALLOW_ACPI_P2 = 1<<6, /* allow transition to ACPI P2 state*/
OFPC_EE_ALLOW_ACPI_P3 = 1<<7, /* allow transition to ACPI P3 state*/
};
```

Thus, using the VoIP flow discussed above as an example, in such embodiments the controller node 12 may direct the group 40 of datapath nodes 14 to implement the following EE actions:

Datapath node 14-1: {buffer<10 ms, drop=0, allow_acpi_c1=true, allow_acpi_c2=true, allow_acpi_c3=false}

Datapath node 14-2: {buffer=0, drop=0, allow_acpi_c2=true, allow_acpi_c3=false}

Datapath node 14-3: {buffer=0, drop=0}.

As another example, the controller node 12 may direct the group 40 of datapath nodes 14 to implement the following EE actions:

Datapath node 14-1: {buffer=0, drop=0, allow_acpi_c1=true, allow_acpi_c2=true, allow_acpi_c3=true}

Datapath node 14-2: {buffer<5 ms, drop=0}

Datapath node 14-3: {buffer<5 ms, drop=0, allow_acpi_c2=true, allow_acpi_c3=false}.

In one embodiment, the controller node 12 may direct the datapath node 14 to perform a particular EE action in a communication comprising the following, or substantially similar, format:

```
enum ofp_action_type {
OFPAT_OUTPUT = 0,           /* Output to switch port. */
OFPAT_COPY_TTL_OUT = 11,    /* Copy TTL "outwards" -- from next-
                               to-
outermost to outermost */
OFPAT_COPY_TTL_IN = 12,     /* Copy TTL "inwards" -- from outer-
                               most
to next-to-outermost */
OFPAT_SET_MPLS_TTL = 15,    /* MPLS TTL */
...
OFPAT_EE_DROP = 28,         /*Drop rate (contant)*/
OFPAT_EE_DROP_RANDOM = 29,  /*Drop rate (random) */
OFPAT_EE_BUFFER = 30        /*Specify Buffer time*/
};
/* Action structure for OFPAT_EE_DROP. */
struct ofp_action_ee_drop {
uint16_t type;              /* OFPAT_EE_DROP. */
uint16_t len;               /* Length is 8. */
uint32_t drop_rate;         /* Drop rate out of 100000 */
};
```

In one embodiment, the above format may be implemented in the OpenFlow standard by amending the existing action structures to include the above-disclosed information.

In some embodiments, each of the datapath nodes 14 includes a respective port queue manager function (PQMF) 51-1-51-3 (generally, PQMF 51) that manages different types of queues to aid in implementing the EE actions performed by the respective datapath nodes 14. In one embodiment, the PQMF 51 executes on the forwarding path of the respective datapath node 14, and aids in implementing the EE actions configured for each flow carried by the respective datapath node 14.

The PQMF 51 manages, in one embodiment, three types of queues for each transmit port 20. The transmit ports 20, in one embodiment, may comprise ports that support link layer EE, such as that described in Institute of Electrical and Electronics Engineers (IEEE) 802.3az. For purposes of illustration, only certain queues are illustrated, but other queues may be utilized as well, such as queues used for implementing quality of service, and the like.

In one embodiment, each datapath node 14 may include a respective Q_i queue 52, which comprises an immediate forward queue. When a packet arrives in the Q_i queue, the packet is passed immediately to a respective transmit port queue (not illustrated) of a lower layer, such as a media access control (MAC) layer, for immediate transmission irrespective of whether the lower layer was in a sleep mode (i.e., an EE mode) or not.

Each datapath node 14 may also include a respective Q_d queue 54, which comprises a virtual queue. When a packet arrives in the Q_d queue 54, the packet is dropped, and in one embodiment, a dropped packet counter is incremented to maintain count of how many packets in the respective flow have been dropped.

Each datapath node 14 may also include a respective Q_b queue 56, which comprises a buffer queue. When a packet arrives in the Q_b queue 56, the packet is timestamped, and may remain buffered for a maximum time of T1, as configured in accordance with the EE action for the respective flow, before being transmitted if the corresponding transmit port 20 is in an EE operating mode.

Figure 4:
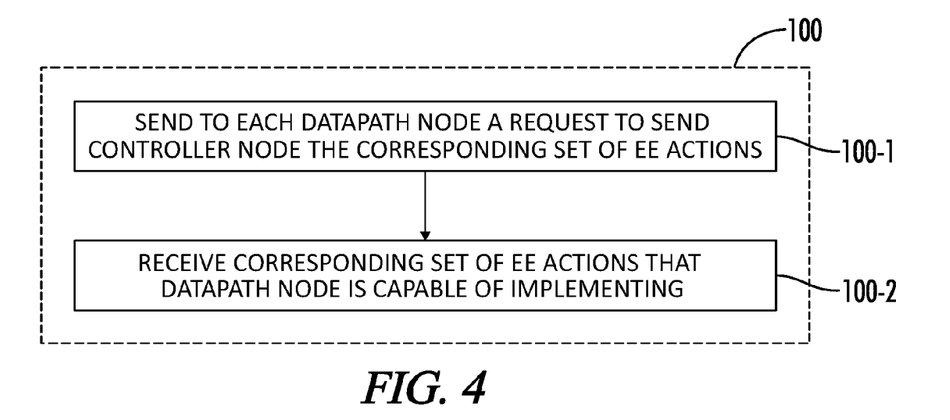
FIG. 4 is a flowchart of a process by which a controller node receives a corresponding set of EE actions that a datapath node is capable of implementing according to one embodiment.

FIG. 4 is a flowchart of a process by which the controller node 12 receives a corresponding set of EE actions that a datapath node 14 is capable of implementing, as discussed above with regard to block 100 of FIG. 3, according to one embodiment. In this embodiment, the controller node 12 sends to each datapath node 14 a request to send the controller node 12 the corresponding set of EE actions that the respective datapath node 14 is capable of implementing (FIG. 4, block 100-1). This request may occur, for example, during an initialization stage when the respective datapath node 14 initially initializes and identifies itself to the controller node 12. The controller node 12 then receives, from each respective datapath node 14, the corresponding set of EE actions that the respective datapath node 14 is capable of implementing (FIG. 4, block 100-2). The controller node stores the corresponding set of EE actions in the EE action set data 38 (FIG. 2).

In one embodiment, the EE actions that a datapath node 14 is capable of implementing may be communicated to the controller node in a communication comprising the following, or substantially similar, format:

```
/* Switch features. */
struct ofp_switch_features {
struct ofp_header header;
uint64_t datapath_id;        /* Datapath unique ID.
                                The lower 48-bits
are for a MAC address, while the upper 16-bits are implementer-defined.
*/
uint32_t n_buffers;          /* Max packets buffered at once. */
uint8_t n_tables;            /* Number of tables supported by
datapath. */
uint8_t auxiliary_id;        /* Identify auxiliary connections */
uint8_t pad[2];              /* Align to 64-bits. */
/* Features. */
uint32_t capabilities;       /* Bitmap of support
                                "ofp_capabilities". */
unt32_t ee_capabilities;     /*Bitmap of supported
"ofp_ee_capabilities" */
uint32_t reserved;
};
/* Energy-efficiency Capabilities supported by the datapath. */
enum ofp_ee_capabilities {
OFPC_EE_DROP = 1 << 0,       /* Drop packet out of 100000. */
OFPC_EE_DROP_RANDOM =        /* Drop random. */
1 << 1,
OFPC_EE_BUFFER = 1 << 2,     /* Buffer packets. */
};
```

In another embodiment, the controller node 12 may fetch the EE action set from a respective datapath node 14. The controller node 12 may use, for example, a Network Configuration Protocol (NETCONF) based OpenFlow (OF)-config protocol and data model. In one embodiment, this may be accomplished, for example, by extending the OF-config 1.1 XML schema, as follows:

```
<xs:complexType name="OFLogicalSwitchType">
  <xs:sequence>
    <xs:element name="id"
    type="OFConfigID"/>
```

-continued

```
<xs:elementname="capabilities"
  type="OFLogicalSwitchCapabilitiesType"/>
  <xs:element name="datapath-id"
  type="OFConfigID"/>
  ....
<xs:elementname=EEcapabilities"
  type="OFLogicalSwitchEECapabilitiesType"/>
</xs:sequence>
</xs:complexType>
<xs:complexType name="OFLogicalSwitchEECapabilitiesType">
  <xs:sequence>
  <xs:element name="EE_Buffer" type="xs:integer">
  <xs:annotation>
  <xs:documentation>The size of the buffer used to store packet
  in order to enable energy effiency policies
  </xs:documentation>
  </xs:annotation>
  </xs:element>
  ....
</xs:sequence>
</xs:complexType>
```

Figure 5:
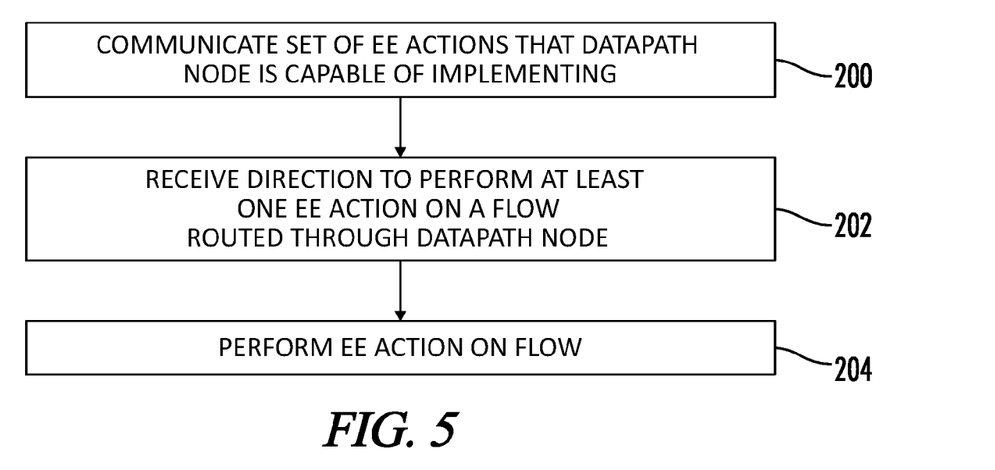
FIG. 5 is a flowchart of a process for implementing an EE policy on a flow from the perspective of a datapath node according to one embodiment.

FIG. 5 is a flowchart of a process for implementing an EE policy on a flow from the perspective of a datapath node 14 according to one embodiment. The datapath node 14 communicates the set of EE actions that the datapath node 14 is capable of implementing (FIG. 5, block 200). As discussed above, the communication of the datapath node 14 may be in conjunction with the initialization of the datapath node 14, in response to a request from the controller node 12 for the EE actions, or may be communicated for any other reason. The datapath node 14 subsequently receives, from the controller node 12, a direction to perform at least one of the EE actions on a flow that is routed through the datapath node 14 (FIG. 5, block 202). The datapath node may record the EE action to perform on the flow in the flow table 24 (FIG. 2). The datapath node 14 then performs, on the flow, the at least one EE action (FIG. 5, block 204).

Figure 6:
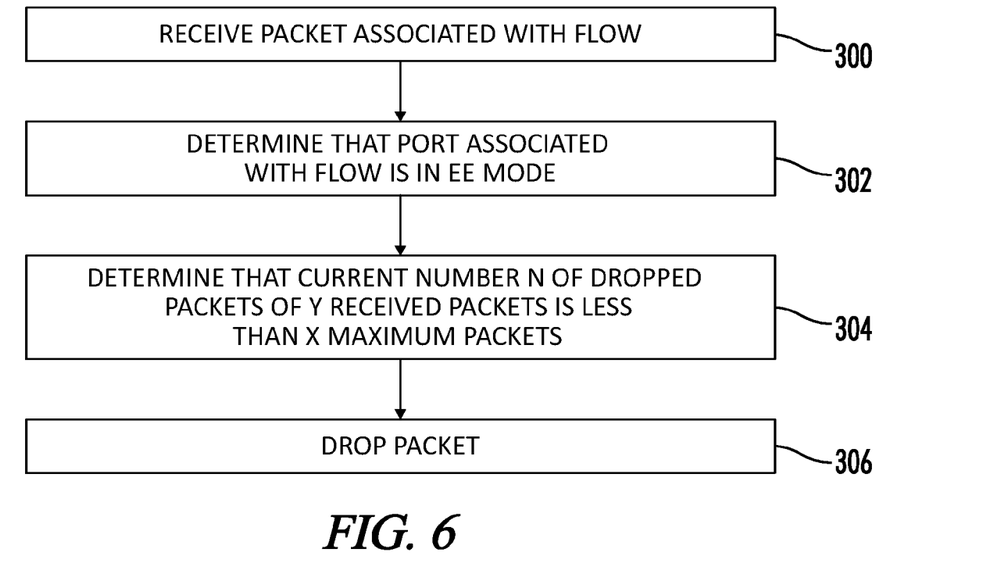
FIG. 6 is a flowchart of a method for implementing a particular EE action on a flow according to one embodiment.

FIG. 6 is a flowchart of a method for implementing a particular EE action on a flow according to one embodiment. Assume for purposes of illustration that the datapath node 14-1 has been directed to perform an EE action on a particular flow that comprises dropping no more than 10 packets out of 1,000 packets if the transmit port 20 through which the flow is routed is in an EE mode. The datapath node 14-1 receives a packet associated with the flow (FIG. 6, block 300). The datapath node 14-1 may access the flow table 24-1 and determine the EE policy discussed above is to be applied to the packet. The datapath node 14-1 determines that the transmit port 20 through which the flow is routed is in an EE mode (FIG. 6, block 302). The datapath node 14-1 accesses one or more counters (not illustrated), and determines that six packets out of the last 1,000 packets received have been dropped (FIG. 6, block 304). Based on this determination, the datapath node 14-1 drops the packet and increments the appropriate counters (FIG. 6, block 306). This is an example wherein the EE policy prioritizes maintaining a transmit port 20 in EE mode rather than consuming the energy necessary to wake the transmit port 20 up to transmit a packet.

Figure 7:
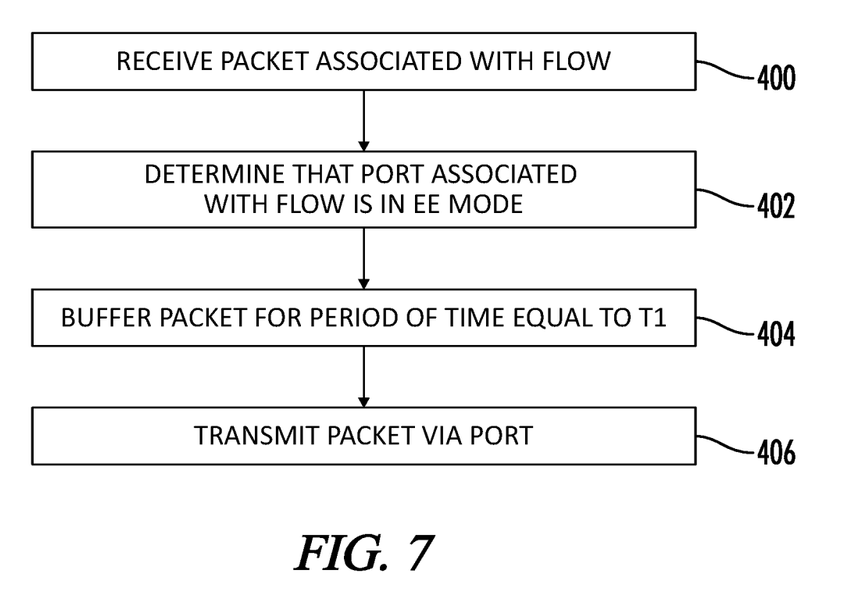
FIG. 7 is a flowchart of a method for implementing another EE action on a flow according to one embodiment.

FIG. 7 is a flowchart of a method for implementing a particular EE action on a flow according to another embodiment. Assume for purposes of illustration that the datapath node 14-1 has been directed to perform an EE action on a particular flow that comprises buffering packets for no more than a period of time T1 if the transmit port 20 through which the flow is routed is in EE mode. The datapath node 14-1 receives a packet associated with the flow (FIG. 7, block 400). The datapath node 14-1 may access the flow table 24-1 and determine that the EE policy discussed above is to be applied to the packet. The datapath node 14-1 determines that the transmit port 20 through which the flow is routed is in an EE mode (FIG. 7, block 402). The datapath node 14-1 then buffers the packet for a period of time no greater than time T1 (FIG. 7, block 404). If the transmit port 20 is awakened to transmit another packet prior to the duration of the period T1, the datapath node 14-1 transmits the packet via the transmit port 20. Alternatively, if, after the duration of the period T1, the transmit port 20 is still in the EE mode, the datapath node 14-1 awakens the transmit port 20 and transmits the packet via the transmit port 20 (FIG. 7, block 406).

Figure 8:
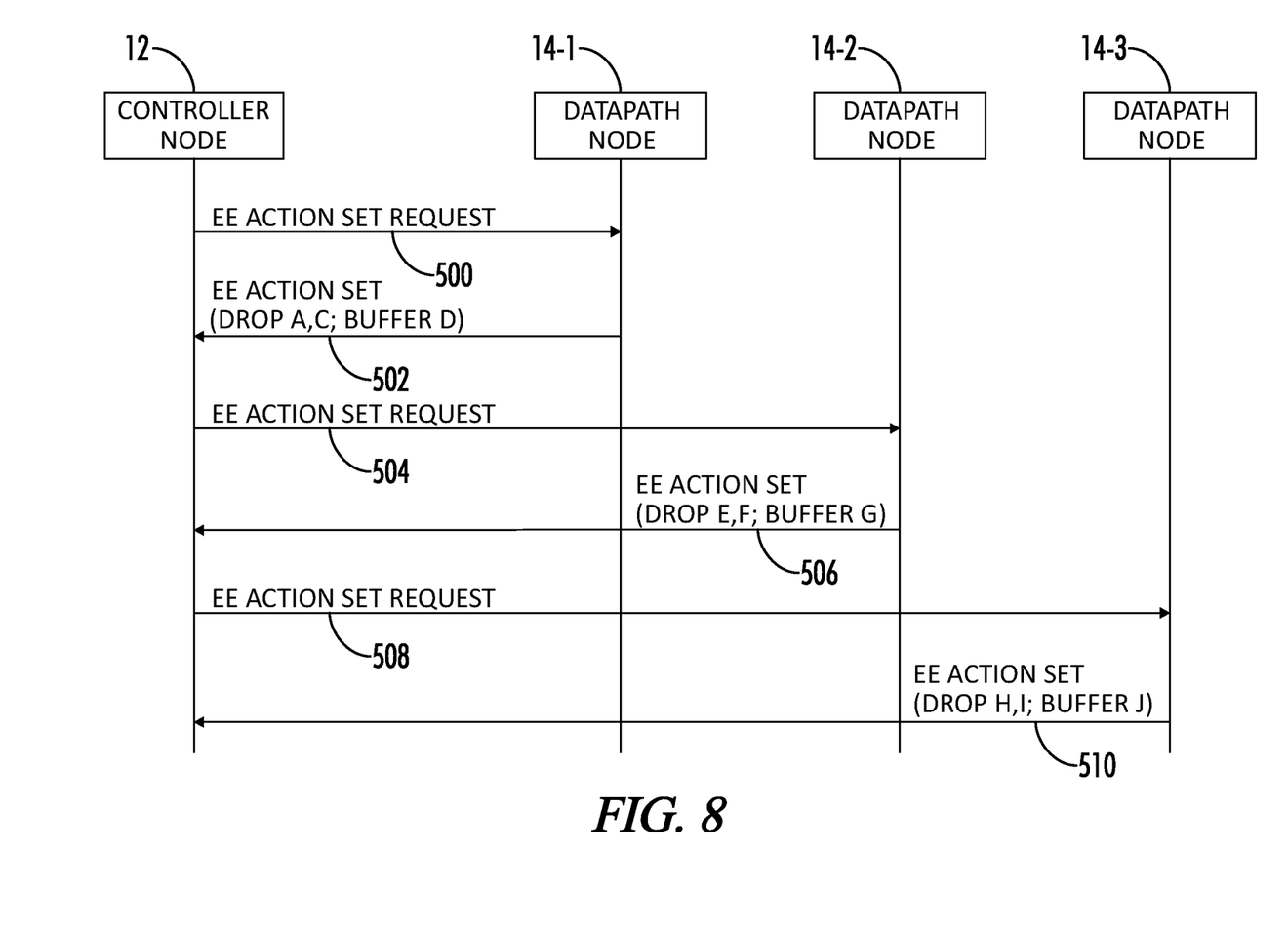
FIG. 8 is a message flow diagram illustrating the communication of EE action sets from datapath nodes to the controller node according to one embodiment.

FIG. 8 is a message flow diagram illustrating the communication of EE action sets from the datapath nodes 14 to the controller node 12 according to one embodiment. Initially, the controller node 12 sends an EE action set request to the datapath node 14-1, which requests the datapath node 14-1 to send to the controller node 12 the corresponding set of EE actions that the datapath node 14-1 is capable of implementing (FIG. 8, step 500). As discussed previously, this request may be made, for example, when the controller node 12 first learns of the existence of the datapath node 14-1, such as when the datapath node 14-1 initializes and establishes communication with the controller node 12. In response to the request, the datapath node 14-1 sends the corresponding set of EE actions that the datapath node 14-1 is capable of implementing (FIG. 8, step 502). In this example, the corresponding set of EE actions comprises an ability to drop A packets out of a total of B packets, and an ability to buffer a packet for a duration of time not exceeding C.

The controller node 12 may subsequently send an EE action set request to the datapath node 14-2 when the controller node 12 becomes aware of the existence of the datapath node 14-3 (FIG. 8, step 504). In response to the request, the datapath node 14-2 sends the corresponding set of EE actions that the datapath node 14-2 is capable of implementing (FIG. 8, step 506). In this example, the corresponding set of EE actions comprises an ability to drop E packets out of a total of F packets, and an ability to buffer a packet for a duration of time not exceeding G.

The controller node 12 may subsequently send an EE action set request to the datapath node 14-3 when the controller node 12 becomes aware of the existence of the datapath node 14-3 (FIG. 8, step 508). In response to the request, the datapath node 14-3 sends the corresponding set of EE actions that the datapath node 14-3 is capable of implementing (FIG. 8, step 510). In this example, the corresponding set of EE actions comprises an ability to drop H packets out of a total of I packets, and an ability to buffer a packet for a duration of time not exceeding J.

Figure 9:
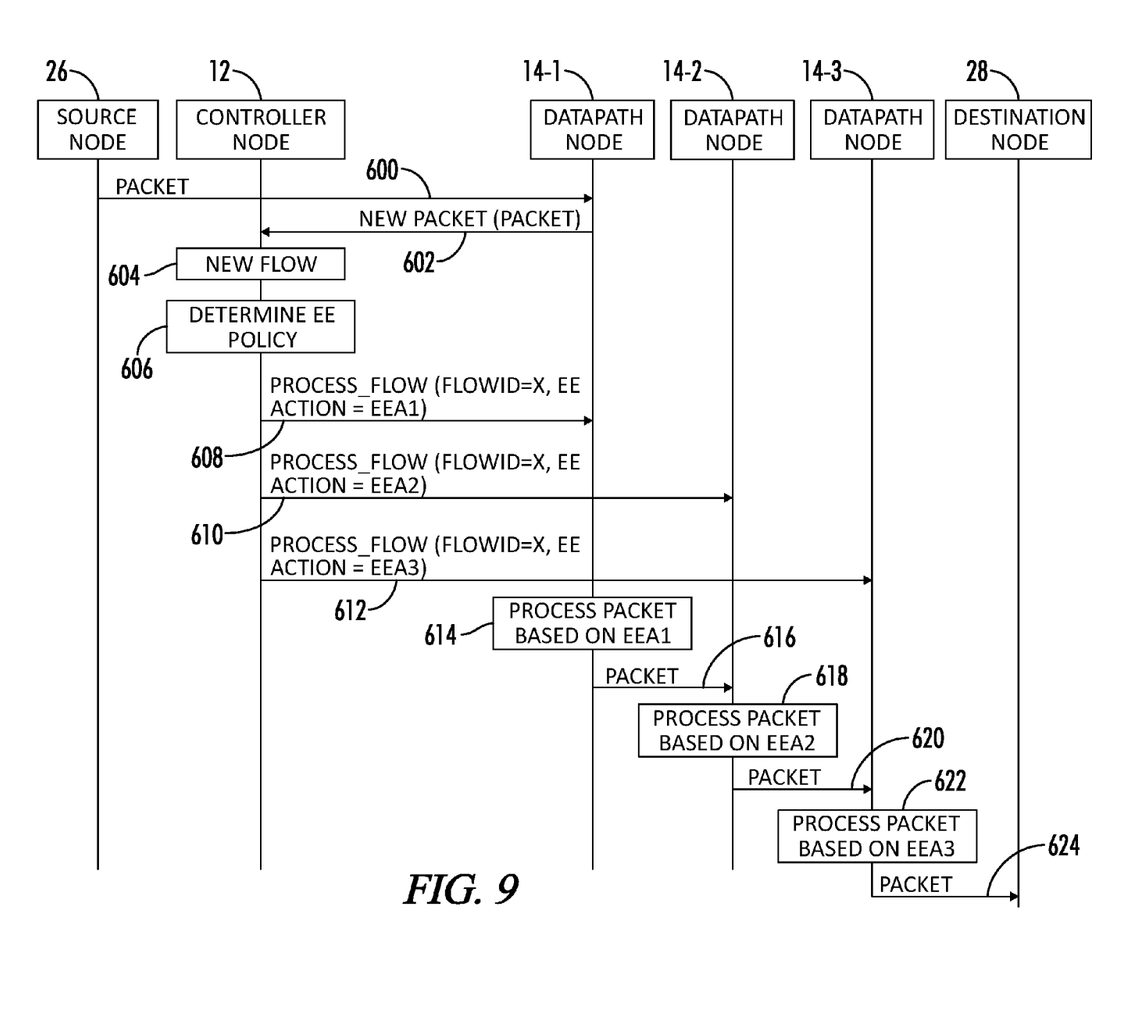
FIG. 9 is a message flow diagram illustrating the setting of an EE policy on a new flow according to one embodiment.

FIG. 9 is a message flow diagram illustrating the setting of an EE policy on a new flow according to one embodiment. Assume for purposes of illustration that the source node 26 transmits a packet that has a destination address of the destination node 28 to the datapath node 14-1 (FIG. 9, step 600). The datapath node 14-1 searches the flow table 24-1, and determines that the packet is associated with a new flow that has not yet been set up in the system 10. The datapath node 14-1 sends a new flow message to the controller node 12 and includes a copy of the packet, or includes information contained in the packet (FIG. 9, step 602). Based on the receipt of the new flow message, the controller node 12 identifies the flow as a new flow (FIG. 9, step 604). The controller node 12 accesses the EE policy data 36 and based on an attribute of the flow, the controller node 12 determines an EE policy to apply to the flow (FIG. 9, step 606). The attributes of the flow may be ascertained, for example, from information contained in the new packet message received from the datapath node 14-1.

The controller node 12 identifies the group 40 of datapath nodes 14-1-14-3 as the datapath nodes 14 through which the flow will be routed from the source node 26 to the destination node 28. The controller node 12 sends a message directing the datapath node 14-1 to implement a first EE action EEA1 on the flow (FIG. 9, step 608). The controller node 12 sends a message directing the datapath node 14-2 to implement a second EE action EEA2 which differs from the EE action EEA1 on the flow (FIG. 9, step 610). The controller node 12 sends a message directing the datapath node 14-3 to implement a third EE action EEA3 which differs from both the EE actions EEA1 and EEA2 on the flow (FIG. 9, step 612).

In one embodiment, the datapath node 14-1 may have buffered the packet at step 602 at the time the datapath node 14-1 forwarded the packet to the controller node 12, as illustrated in FIG. 9. In such embodiments, the datapath node 14-1 then processes the retained packet in accordance with the first EE action EEA1 (FIG. 9, step 614). The datapath node 14-1 sends the packet to the datapath node 14-2 (FIG. 9, step 616). In other embodiments, the datapath node 14-1 may have released, or otherwise dropped, the packet after sending the packet to the controller node 12 at step 602. In such embodiments, the controller node 12 may then resend the packet to the datapath node 14-1 prior to step 614, for processing by the datapath node 14-1 at step 614.

The datapath node 14-2 then processes the packet in accordance with the second EE action EEA2 (FIG. 9, step 618). The datapath node 14-2 sends the packet to the datapath node 14-3 (FIG. 9, step 620). The datapath node 14-3 then processes the packet in accordance with the third EE action EEA3 (FIG. 9, step 622). The datapath node 14-2 sends the packet to the destination node 28 (FIG. 9, step 624).

Figure 10:
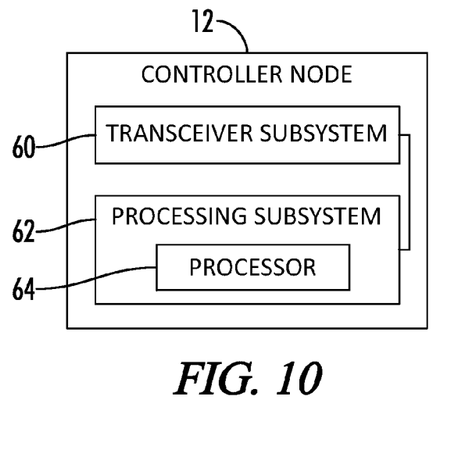
FIG. 10 is a block diagram of the controller node according to one embodiment.

FIG. 10 is a block diagram of the controller node 12 according to one embodiment. In addition to elements discussed previously, the controller node 12, includes, for example, a transceiver subsystem 60 and a processing subsystem 62. The transceiver subsystem 60 generally includes components for sending and receiving communications to and from other nodes, such as the datapath nodes 14. From a communications protocol view, the transceiver subsystem 60 may implement at least part of Layer 1 (i.e., the Physical or "PHY" Layer). The processing subsystem 62 generally implements other remaining portions of Layer 1, as well as functions for higher layers in communications protocols (e.g., Layer 2 (data link layer), Layer 3 (network layer), etc.). Of course, the detailed operation for each of the functional protocol layers, and thus the transceiver subsystem 60 and the processing subsystem 62, will vary depending on both the particular implementation as well as the standard or standards supported by the controller node 12.

Those skilled in the art will appreciate that the block diagram of the controller node 12 necessarily omits numerous features that are not necessary to a complete understanding of this disclosure. Although all of the details of the processing subsystem 62 are not illustrated, the processing subsystem 62 comprises one or several general-purpose or special-purpose processors 64 or other microcontrollers programmed with suitable software programming instructions and/or firmware to carry out some or all of the functionality of the network nodes described herein. In addition, or alternatively, the processing subsystem 62 comprises various digital hardware blocks (e.g., one or more Application Specific Integrated Circuits (ASICs), one or more off-the-shelf digital or analog hardware components, or a combination thereof) configured to carry out some or all of the functionality of the controller node 12 described herein. The controller node 12 may also include one or more storage media for storing data necessary and/or suitable for implementing the functionality described herein, as well as for storing complex programming instructions which, when executed on the processor 64, may implement all or part of the functionality described herein. One embodiment of the present disclosure may be implemented as a computer program product that is stored on a computer-readable storage medium, the computer program product including complex programming instructions that are configured to cause a processor, such as the processor 64, to carry out the steps described herein.

Figure 11:
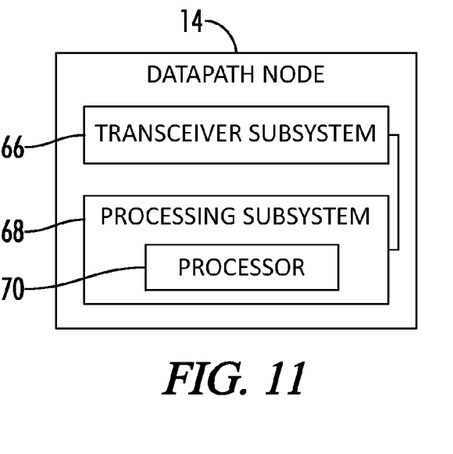
FIG. 11 is a block diagram of a datapath node according to one embodiment.

FIG. 11 is a block diagram of the datapath node 14 according to one embodiment. In addition to elements discussed previously, the datapath node 14 may, for example, include a transceiver subsystem 66 and a processing subsystem 68. The transceiver subsystem 66 generally includes components for sending and receiving communications to and from other nodes, such as the datapath nodes 14 and the controller node 12. From a communications protocol view, the transceiver subsystem 66 may implement at least part of Layer 1. The processing subsystem 68 generally implements other remaining portions of Layer 1, as well as functions for higher layers in communications protocols (e.g., Layer 2 (data link layer), Layer 3 (network layer), etc.), as well as other functionality described herein as being associated with a datapath node 14. Of course, the detailed operation for each of the functional protocol layers, and thus the transceiver subsystem 66 and the processing subsystem 68, will vary depending on both the particular implementation as well as the standard or standards supported by the datapath node 14.

Those skilled in the art will appreciate that the block diagram of the datapath node 14 necessarily omits numerous features that are not necessary to a complete understanding of this disclosure. Although all of the details of the processing subsystem 68 are not illustrated, the processing subsystem 68 comprises one or several general-purpose or special-purpose processors 70, or other microcontrollers programmed with suitable software programming instructions and/or firmware to carry out some or all of the functionality of the datapath nodes 14 described herein, including, in some embodiments, the PPE discussed above. In addition, or alternatively, the processing subsystem 68 comprise various digital hardware blocks (e.g., one or more Application Specific Integrated Circuits (ASICs), one or more off-the-shelf digital or analog hardware components, or a combination thereof) configured to carry out some or all of the functionality of the network nodes described herein. The datapath node 14 may also include one or more storage media for storing data necessary and/or suitable for implementing the functionality described herein, as well as for storing complex programming instructions which, when executed on the processor 70, may implement all or part of the functionality described herein. One embodiment of the present disclosure may be implemented as a computer program product that is stored on a computer-readable storage medium, the computer program product including complex programming instructions that are configured to cause a processor, such as the processor 70, to carry out the steps described herein.

The present embodiments, among other advantages, facilitate per-flow EE policy processing in an SDN, which enables system operators to optimize the use of autonomic EE features. The embodiments enable system operators to significantly reduce energy consumption and carbon footprint. The embodiments also enable system operators to provide differentiated services and leverage EE features of the system infrastructure. For example, in a particular category of services, customers may accept a slight degradation of quality outside business hours (increase in latency, slight increase in packet loss, etc.) in exchange for earning loyalty points that could be spent in an operator application store or on credits against network use during business hours. This could, in turn, allow the system operators to gain increased customer loyalty while also expanding their green credentials.

The following acronyms are used throughout this disclosure:
ACPI Advanced Configuration and Power Interface
ASICs Application Specific Integrated Circuits
EE energy efficiency
FTP File Transport Protocol
IEEE Institute of Electrical and Electronics Engineers
IP Internet Protocol
MAC media access control
NETCONF Network Configuration Protocol
OF OpenFlow
OSPF Open Shortest Path First
PPE packet processing engine
PQMF port queue manager function
RTP Real-time Transport Protocol
SDN software-defined network
VoIP Voice over Internet Protocol
VPN virtual private network Those skilled in the art will recognize improvements and modifications to the preferred embodiments of the present disclosure. All such improvements and modifications are considered within the scope of the concepts disclosed herein and the claims that follow.

What is claimed is:

1. A method for implementing an energy efficiency (EE) policy on a flow, comprising:
   receiving, by a controller node from each of a plurality of datapath nodes, a corresponding set of EE actions that the respective datapath node is capable of implementing;
   identifying, by the controller node, a flow;
   identifying a group of datapath nodes through which the flow is routed;
   based on an attribute of the flow and on the sets of EE actions that correspond to the datapath nodes in the group of datapath nodes through which the flow is routed, determining an EE policy; and
   based on the EE policy, directing at least one datapath node in the group of datapath nodes to perform at least one first EE action from the corresponding set of EE actions on packets associated with the flow.

2. The method of claim 1, further comprising directing the at least one datapath node to set up the flow.

3. The method of claim 1, further comprising sending to each of the plurality of datapath nodes a request to send the controller node the corresponding set of EE actions that the datapath node is capable of implementing.

4. The method of claim 1, wherein the attribute of the flow comprises one of a type of the flow, a source node of the flow, and a destination node of the flow.

5. The method of claim 1, further comprising:
   based on the EE policy, directing a second datapath node in the group of datapath nodes to perform a second EE action from the corresponding set of EE actions on packets associated with the flow.

6. The method of claim 5, wherein the second EE action is different from the at least one first EE action.

7. The method of claim 1, wherein the at least one first EE action comprises an action to buffer a packet associated with the flow for a maximum period of time T1 when a port associated with the flow is in an EE mode.

8. The method of claim 1, wherein the at least one first EE action comprises an action to drop a maximum of X packets out of a total of Y received packets when a port associated with the flow is in an EE mode.

9. A controller node for implementing an energy efficiency (EE) policy on a flow, comprising:
   a transceiver subsystem configured to communicate with a plurality of datapath nodes; and
   a processing subsystem coupled to the transceiver subsystem and configured to:
      receive, from each of the plurality of datapath nodes, a corresponding set of EE actions that the respective datapath node is capable of implementing;
      identify a flow;
      identify a group of datapath nodes through which the flow is routed;
      based on an attribute of the flow and on the sets of EE actions that correspond to the datapath nodes in the group of datapath nodes through which the flow is routed, determine an EE policy; and
      based on the EE policy, direct at least one datapath node in the group of datapath nodes to perform at least one first EE action from the corresponding set of EE actions on packets associated with the flow.

10. The controller node of claim 9, wherein the processing subsystem is further configured to direct the at least one datapath node to set up the flow.

11. The controller node of claim 9, wherein the processing subsystem is further configured to send to each of the plurality of datapath nodes a request to send the controller node the corresponding set of EE actions that the datapath node is capable of implementing.

12. The controller node of claim 9, wherein the attribute of the flow comprises one of a type of the flow, a source node of the flow, and a destination node of the flow.

13. The controller node of claim 9, wherein the processing subsystem is further configured to, based on the EE policy, direct a second datapath node in the group of datapath nodes to perform a second EE action from the corresponding set of EE actions on packets associated with the flow.

14. The controller node of claim 13, wherein the second EE action is different from the at least one first EE action.

15. The controller node of claim 9, wherein the at least one first EE action comprises an action to buffer a packet associated with the flow for a maximum period of time T1 when a port associated with the flow is in an EE mode.

16. The controller node of claim 9, wherein the at least one first EE action comprises an action to drop a maximum of X packets out of a total of Y received packets when a port associated with the flow is in an EE mode.

* * * * *